United States Patent [19]

Yang

[11] Patent Number: 6,130,775
[45] Date of Patent: Oct. 10, 2000

[54] BIDIRECTIONAL OPTICAL FIBER AMPLIFIER

[75] Inventor: Tae Su Yang, Incheon, Rep. of Korea

[73] Assignee: Daewoo Telecom Ltd., Incheon, Rep. of Korea

[21] Appl. No.: 09/162,353

[22] Filed: Sep. 29, 1998

[30] Foreign Application Priority Data

Sep. 30, 1997 [KR] Rep. of Korea ............ 97-49926

[51] Int. Cl.[7] ............................................. H01S 3/00
[52] U.S. Cl. ............................................. 359/341
[58] Field of Search ............ 359/341, 124, 359/134, 333

[56] References Cited

U.S. PATENT DOCUMENTS

| | | | |
|---|---|---|---|
| 5,365,368 | 11/1994 | Hsu et al. | 359/341 |
| 5,548,438 | 8/1996 | Delavaux | 359/341 |
| 5,604,627 | 2/1997 | Kohn | 359/341 |
| 5,652,675 | 7/1997 | Shibuga | 359/341 |
| 5,748,363 | 5/1998 | Duck et al. | 359/341 |
| 5,812,306 | 9/1998 | Mizrahi | 359/341 |
| 5,815,308 | 9/1998 | Kim et al. | 359/341 |
| 5,875,054 | 2/1999 | Onoda | 359/341 |
| 5,995,259 | 11/1999 | Meli et al. | 359/134 |

*Primary Examiner*—Mark Hellner
*Attorney, Agent, or Firm*—Bacon & Thomas, PLLC

[57] ABSTRACT

A bidirectional optical fiber amplifier includes a first and a second transmitters for generating a first and a second signal lights, respectively, a first and a second receivers for receiving the first and the second signal lights, respectively, a fiber amplifier for amplifying the first and the second signal lights, a first optical circulator for transmitting the first signal light from the first transmitter to the fiber amplifier and for transmitting the second signal light from the fiber amplifier to the second receiver, a second optical circulator for transmitting the first signal light from the fiber amplifier to the first receiver and for transmitting the second signal light from the second transmitter to the fiber amplifier and a pair of optical pumps for pumping the fiber amplifier.

12 Claims, 2 Drawing Sheets

BIDIRECTIONAL OPTICAL FIBER AMPLIFIER

FIELD OF THE INVENTION

The present invention relates to an optical amplifier; and, more particularly, to an improved optical fiber amplifier for transmitting or amplifying signal lights in two directions.

DESCRIPTION OF THE PRIOR ART

Recent development of optical communication technologies using optical fibers has achieved a high rate of data transmission performance at a relatively low cost. However, demands for transmitting or amplifying signal lights in two directions have also been increasing in the optical communications due to the rapid increase in the amount of data to be transmitted. Therefore, various types of bidirectional optical amplifiers utilizing optical fibers have been recently developed to meet the requirements.

In FIG. 1, there is illustrated a prior art bidirectional optical amplifier 100 utilizing a four port optical circulator, as disclosed in U.S. Pat. No. 5,548,438, entitled "Bidirectional Optical Amplifier". The optical amplifier 100 comprises a circulator 110 having four ports A, B, C and D, a first and a second fiber amplifiers 122, 128, a multiflexer 130, a first and a second lasers 140, 142 and an isolator 124. In the optical amplifier 100, an upstream signal enters the port A of the optical circulator 110 and exits from port D of the optical circulator 110 after being amplified by both fiber amplifiers 122, 128. The upstream signal from the port B is amplified by the first fiber amplifier 122, wherein the first laser 140 pumps the first fiber amplifier 122 so as to act as a preamplifier with a low noise figure and some gain. The preamplified upstream signal arrives at the isolator 124 which is capable of eliminating an amplified spontaneous emission (ASE) propagating opposite to the direction of the preamplified upstream signal.

The upstream signal passing through the isolator 124 is transmitted to the second fiber amplifier 128. The second laser 142 pumps the second fiber amplifier 128 for serving as a power booster with high output power. The amplified upstream signal enters the port C of the optical circulator 110 and exits from the port D of the optical circulator 110, thereby amplifying the upstream signal by using both fiber amplifiers 122, 128.

On the other hand, a downstream signal travels from the port D to the port A of the optical circulator 110.

One of the major shortcomings of the above-described bidirectional optical amplifier is that it requires additional fiber amplifiers to amplify the downstream signal.

SUMMARY OF THE INVENTION

It is, therefore, a primary object of the present invention to provide an optical amplifier capable of amplifying signal lights in two directions by using one fiber amplifier.

In accordance with the present invention, there is provided a bidirectional optical amplifier for amplifying signals in two directions, comprising: a first and a second transmitters for generating a first and a second signal lights, respectively; a first and a second receivers for receiving the first and the second signal lights, respectively; a fiber amplifier for amplifying the first and the second signal lights; a first optical circulator including a first, a second and a third ports for transmitting the first signal light from the first transmitter to the fiber amplifier and for transmitting the second signal light from the fiber amplifier to the second receiver, wherein the first signal light enters the first port and exits from the second port of the first optical circulator; a second optical circulator including a first, a second and a third ports for transmitting the first signal light from the fiber amplifier to the first receiver and for transmitting the second signal light from the second transmitter to the fiber amplifier, wherein the second signal light enters the first port and exits from the second port of the second optical circulator; a first wavelength divisional multiplexing coupler for connecting the second signal light to the third port of the first optical coupler and a second wavelength divisional multiplexing coupler for connecting the first signal light to the third port of the second optical coupler; and a pair of optical pumps for generating a first and a second pumping lights.

BRIEF DESCRIPTION OF THE DRAWINGS

The above and other objects and features of the present invention will become apparent from the following description of preferred embodiments, when given in conjunction with the accompanying drawings, wherein.

DETAILED DESCRIPTION OF THE PREFERRED EMBODIMENTS

Figure 1:
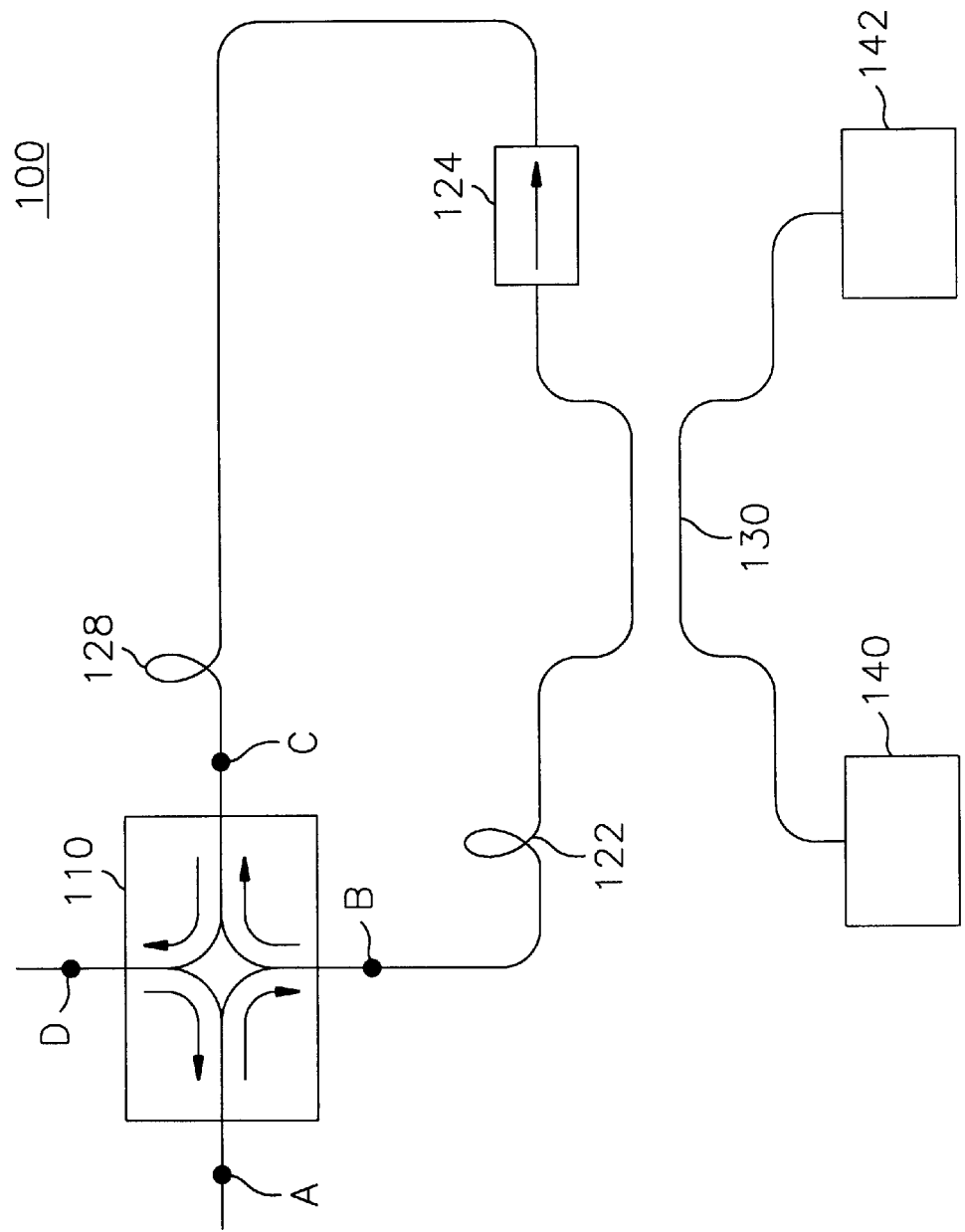
FIG. 1 is a schematic representation of the prior art bidirectional optical amplifier.
Figure 2:
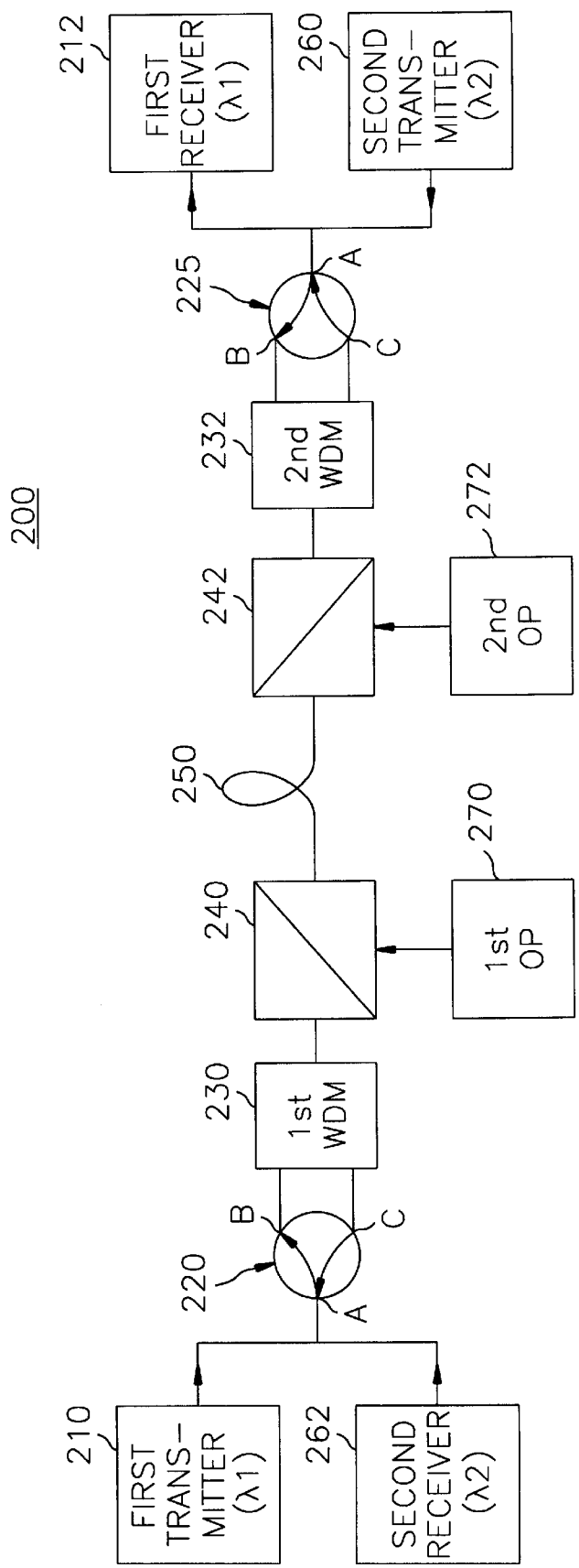
FIG. 2 presents a schematic illustration of the inventive bidirectional fiber optical amplifier.

Referring to FIG. 2, there is shown a schematic illustration of a bidirectional optical fiber amplifier 200 in accordance with a preferred embodiment of the present invention.

The optical amplifier 200 comprises a first and a second transmitters 210, 260, a first and a second receivers 212, 262, a first and a second optical circulators 220, 225, each of the optical circulators 220, 225 including a first, a second and a third ports A, B and C, a first and a second wavelength division multiplexing(WDM) couplers 230, 232, a first and a second optical couplers 240, 242, a first and a second optical pumps 270, 272 for emitting a first and a second pumping lights, respectively, and a fiber amplifier 250, wherein the fiber amplifier 250 is made of an optical fiber which is doped with dopants such as erbium ions. It should be noted that the fiber amplifier 250 is made of an optical fiber which is doped with other rare-earth dopant.

In the optical amplifier 200, the first transmitter 210, e.g., a distributed feed back(DFB) laser, generates a first signal light having a wavelength $\lambda_1$, e.g., 1530 nm. The first signal light enters into the first port A of the first optical circulator 220 and exits from the second port B of the first optical circulator 220. The first signal light from the second port B of the first optical circulator 220 is transmitted to the first optical coupler 240 by the first WDM coupler 230, wherein the first WDM coupler 230 transmits the first signal light from the second port B of the first optical circulator 220 to the first optical coupler 240 and also transmits a second signal light generated from the second transmitter 260 to the third port C of the first optical circulator 220. The first optical coupler 240 transmits the first signal light from the first WDM coupler 230 to the fiber amplifier 250. In the meantime, the 1st optical pump(OP) 270, e.g., a semiconductor laser, generates a first pumping light which is sent to the fiber amplifier 250 by the first optical coupler 240 so that the fiber amplifier 250 acts as a preamplifier for the first signal light, wherein the first optical coupler 240 couples the first signal light with the first pumping light. If the fiber amplifier 250 is made of an erbium doped fiber, 1550 nm light bands and 980 nm light band may be used for the signal lights and the first pumping light, respectively.

Thereafter, the first preamplified signal light is transmitted to the second WDM coupler 232 through the second optical coupler 242 while the 2nd OP 272, e.g., a semiconductor laser, emits a second pumping light and sends the second pumping light to the fiber amplifier 250 to boost the first preamplified signal light. The second optical coupler 242 couples the second pumping light with the first preamplified signal light. In the first preferred embodiment of the present invention, if the fiber amplifier 250 is made of an erbium doped fiber, 1480 nm band light can be used as the second pumping light to pump the fiber amplifier 250. The boosted first signal light enters the second WDM coupler 232 which transmits the boosted first signal light to the third port C of the second optical circulator 225. The boosted first signal light exits from the first port A of the second optical circulator 225 and goes to the first receiver 212.

On the other hand, the second transmitter 260, e.g., a DFB laser, generates the second signal light having a wavelength $\lambda_2$, e.g., 1560 nm. The second signal light enters into the first port A of the second optical circulator 225 and exits from the second port B of the second optical circulator 225. The second signal light from the second port B of the second optical circulator 225 is transmitted to the second optical coupler 242 by the second WDM coupler 232, wherein the second WDM coupler 232 transmits the second signal light from the second port B of the second optical circulator 225 to the second optical coupler 242 and also transmits the boosted first signal light to the third port C of the second optical circulator 225. The second optical coupler 242 transmits the second signal light from the second WDM coupler 232 to the fiber amplifier 250. In the meantime, the 2nd OP 272 generates the second pumping light which is sent to the fiber amplifier 250 by the second optical coupler 242 so that the fiber amplifier 250 acts as a preamplifier for the second signal light, wherein the second optical coupler 242 couples the second signal light with the second pumping light.

Thereafter, the second preamplified signal light is transmitted to the first WDM coupler 230 through the first optical coupler 240. The 1st OP 270 boosts the fiber amplifier 250 to thereby obtain a boosted second signal light, wherein the first optical coupler 240 couples the first pumping light with the second preamplified signal light. The boosted second signal light enters the first WDM coupler 230 which transmits the boosted second signal light to the third port C of the first optical circulator 220. The boosted second signal light exits from the first port A of the first optical circulator 220 and goes to the second receiver 262.

While the present invention has been described with respect to certain preferred embodiments only, other modifications and variations may be made without departing from the scope and spirit of the present invention as set forth in the following claims.

What is claimed is:

1. A bidirectional optical amplifier for amplifying signals in two directions, comprising:

first and second transmitters for generating first and second signal lights, respectively;

first and second receivers for receiving the first and the second signal lights, respectively;

a fiber amplifier for amplifying the first and the second signal lights;

a first optical circulator for transmitting the first signal light from the first transmitter to the fiber amplifier and for transmitting the second signal light from the fiber amplifier to the second receiver;

a second optical circulator for transmitting the first signal light from the fiber amplifier to the first receiver and for transmitting the second signal light from the second transmitter to the fiber amplifier; and means for pumping the fiber amplifier, wherein each of the optical circulators includes a first port, a second port, and a third port, wherein the first port of the first optical circulator is commonly coupled to the first transmitter and the first receiver, and the first port of the second optical circulator is commonly coupled to the second transmitter and the second receiver, and wherein the bidirectional optical amplifier further includes:

a first wavelength divisional multiplexing coupler coupled to the third port of the first optical circulator for transmitting the second signal light to the third port of the first optical circulator and a second wavelength divisional multiplexing coupler coupled to the third port of the second optical circulator for transmitting the first signal light to the third port of the second optical circulator.

2. The optical amplifier of claim 1, wherein the first signal light enters the first port and exits from the second port of the first optical circulator.

3. The optical amplifier of claim 2, wherein the second signal light enters the first port and exits from the second port of the second optical circulator.

4. The optical amplifier of claim 1, wherein the pumping means includes a light source for generating a pumping light and means for coupling the pumping light with the signal lights.

5. The optical amplifier of claim 4, wherein the fiber amplifier is made by being doped with erbium ions.

6. The optical amplifier of claim 5, wherein the pumping means includes a first and a second light sources for generating a first and a second pumping lights.

7. The optical amplifier of claim 6, wherein the pumping means further includes a first coupler for coupling the first pumping light with the signal lights and a second coupler for coupling the second pumping light with the signal lights.

8. The optical amplifier of claim 7, wherein the signal light beams are of 1550 nm band lights.

9. The optical amplifier of claim 8, wherein the first pumping light is of 980 nm band light.

10. The optical amplifier of claim 9, wherein the second pumping light is of 1480 nm band light.

11. The optical amplifier of claim 7, wherein, if the first signal light enters the fiber amplifier, the first light source pumps the fiber amplifier so that the fiber amplifier serves as a preamplifier.

12. The optical amplifier of claim 11, wherein the second light source pumps the fiber amplifier so that the fiber amplifier acts as a booster amplifier.

* * * * *